Nov. 5, 1940.  F. M. GRIETEN  2,220,519
FISHING REEL MECHANISM
Filed May 7, 1938  3 Sheets-Sheet 1

Inventor
F. M. Grieten
By Mason Fenwick & Lawrence
Attorneys

Patented Nov. 5, 1940

2,220,519

UNITED STATES PATENT OFFICE 2,220,519

FISHING REEL MECHANISM

Frederick M. Grieten, Miami, Fla.

Application May 7, 1938, Serial No. 206,676

11 Claims. (Cl. 242—84.5)

This invention relates to fishing reels designed for catching large fish, particularly those of such strength and magnitude as to tax the man power at the operating end of the reel.

This invention is an improvement upon the reel described in my co-pending application Serial No. 151,927, filed July 3, 1937, which issued April 11, 1939 as Patent No. 2,153,923.

The general object of the invention is to provide a reel having a brake between the operating handle and the spool which may be set at such pressure value as to provide slippage between the spool and the handle determined according to the rated strength of the line and at a desired point short of the breakage point of the line so that in no instance regardless of the pull of the fish will the line be stressed to a greater extent than that determined by the brake setting, the construction of the reel being such that in winding in a fish there is no slippage between the spool and the winding handle for such pull or weight value of the fish which is less than the maximum pressure for which the brake is set, so that up to that point the operator winds in against the pull or weight of the fish, but should the fish give a sudden pull or jerk which exceeds the value of the pressure for which the brake is set, while the operator is winding in, the reel and the line are subjected only to that portion of the pull or jerk which equals the initial setting of the brake, so that it follows, the operator may be winding the handle of the reel against the maximum pressure for which the brake is set while the fish is still drawing out the line.

Insofar as the improvements which distinguish this invention from the said co-pending application are concerned, the objects of the invention are to provide a demountable handle which may be changed from high to low gear position; to provide means whereby the pressure of the brake may be delicately adjusted from complete release to the maximum pressure; and to provide improved means for operating the bell cranks which are associated with the actuation of the brake band.

Other objects of the invention will appear as the following description of a preferred and practical embodiment thereof proceeds.

In the drawings throughout the several figures of which the same characters of reference have been employed to designate identical parts:

Figure 5 is a section taken along the curved line of 5—5 of Figure 4;

Figure 6 is a section taken along the line 6—6 of Figure 4;

Figure 8 is a section taken along the line 8—8 of Figure 2; and

Figure 9 is a section taken along the line 9—9 of Figure 2, the direction of the several views being indicated by arrows at the ends of the respective section lines.

Figure 1:
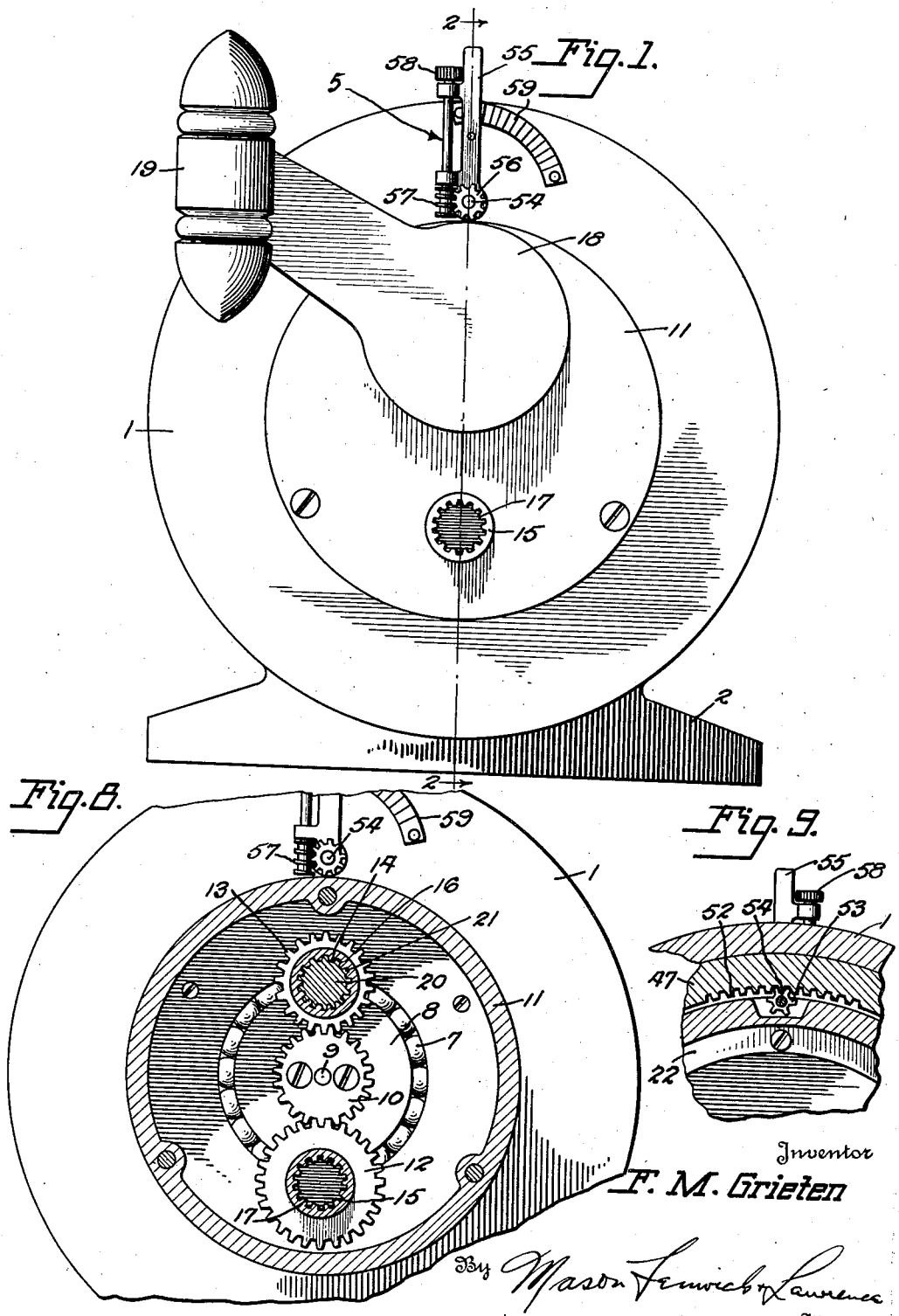
Figure 1 is a side elevation of a reel embodying the principles of the present invention.

Referring now in detail to the several figures, the numeral 1 represents a frame which is adapted to be fixed by means of the bracket 2, to a heavy pole or other suitable fixture. The frame encloses the spool 3 and also the brake mechanism which is shown to the right of the partition 4, with the exception of the final manual lever 5 and those parts which will be described later on which are directly associated with it.

Figure 2:
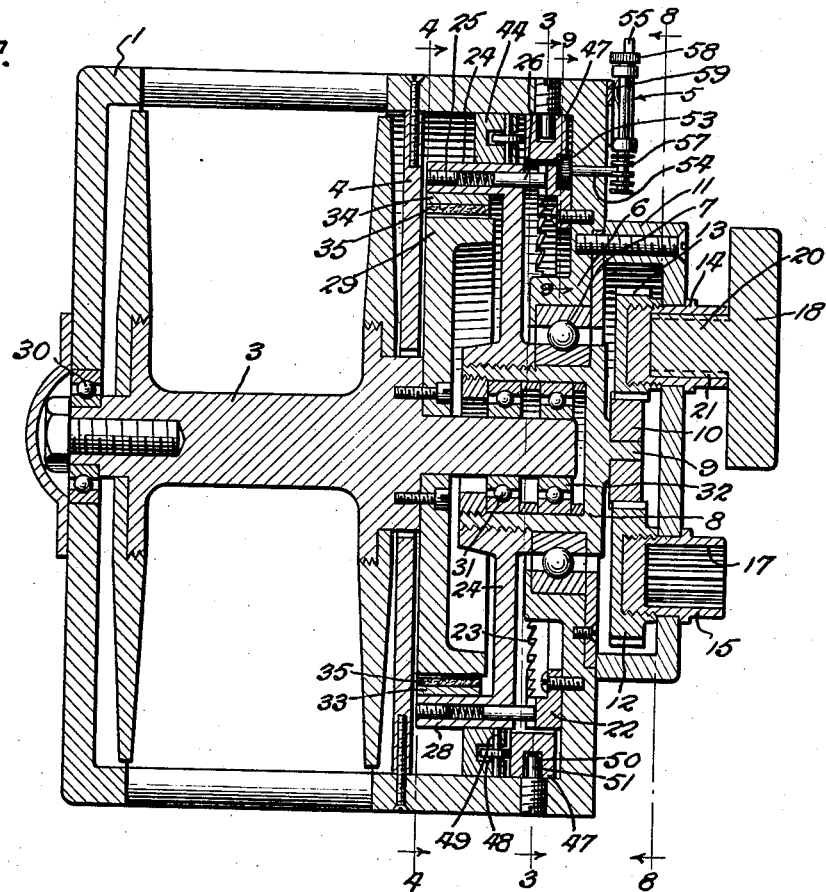
Figure 2 is an axial section taken along the line 2—2 of Figure 1.
Figure 3:
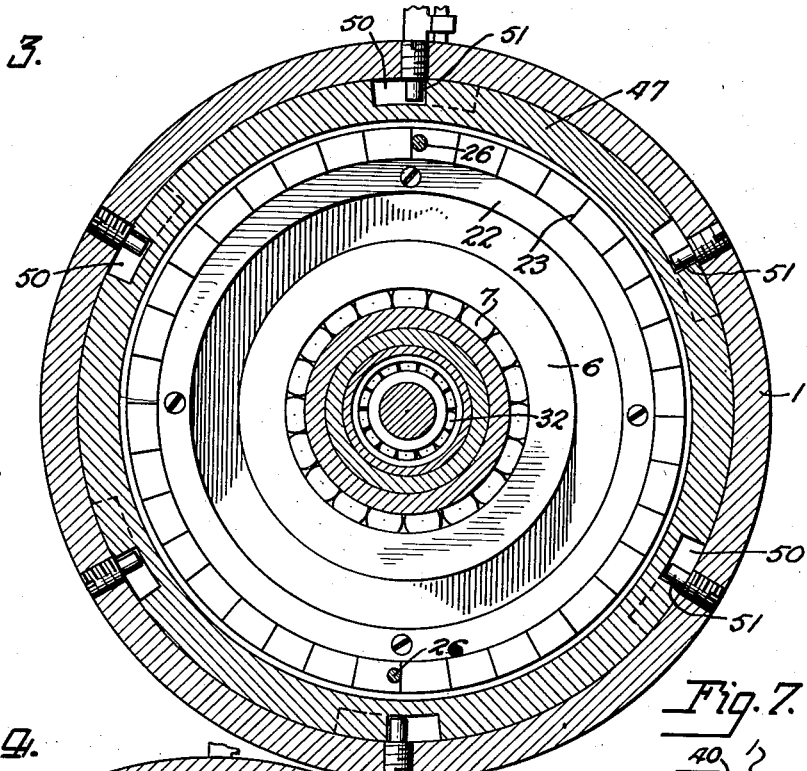
Figure 3 is a diametrical section taken along the line 3—3 of Figure 2.

The front of the frame terminates in an annulus 6 forming a seat for a heavy ball bearing 7. Within this bearing is journalled a cup-like member 8, the exposed end 9 of which is suitably fixed to the central gear 10 shown in Figure 8. This central gear is outside of the plane of the adjacent end wall of the frame and it is enclosed within a casing 11 which is suitably secured to the frame. Within the casing 11 and in mesh with the central gear 10 are the high speed gear 12 and the low speed gear 13 which may have a ratio of two to one. These gears are respectively secured to socket members 15 and 14 journalled in the end wall of the casing 11. The inner bores of said socket members are formed with spline grooves 16 and 17 for the selective reception of the removable crank 18 shown in its entirety in Fig. 1 and having the hand grip 19. Figures 2 and 8 show that this crank has a boss 20 having spline teeth 21 matching with the spline groove 16 so as to effect the rotation of the gears 12 or 13 according to with which one said crank is connected.

Uni-directional rotation of the crank and the associated gears is effected by the following instrumentalities. On the inner end face of the frame 1 a ratchet ring 22 is secured having the ratchet teeth 23. On the cup-like member 8 is secured a circular plate 24 having hollow guides 25 from which pins 26 are spring-projected into contact with the ratchet teeth. Thus the plate 24 and with it the cup-like member, the gears and the operating crank can only rotate in the direction of the sloping teeth of the ratchet ring.

Figure 4:
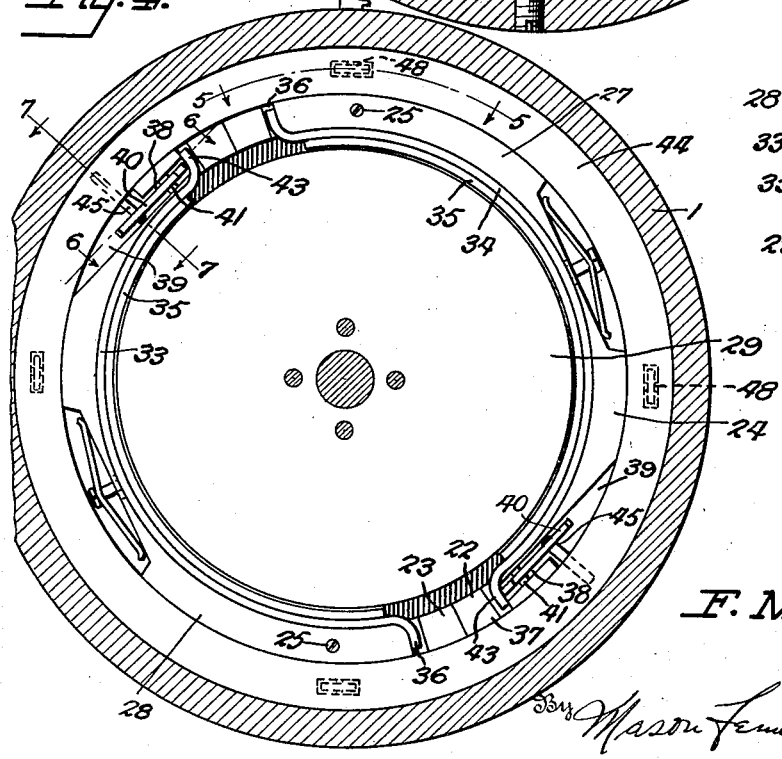
Figure 4 is a diametrical section taken along the line 4—4 of Figure 2.
Figure 7:
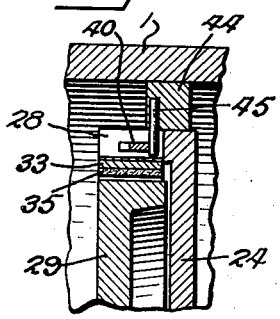
Figure 7 is a section taken along the line 7—7 of Figure 4.

The plate 24 is provided with a pair of diametrically opposite segmental flanges 27 and 28 best shown in Figure 4. These flanges surround the periphery of the brake drum 29 which is secured to the spool 3. As shown in Figure 2 the spool 3 is carried in a bearing 30 in the outer end wall of the frame 1 and by bearings 31 and 32 seated within the cup-like member 8.

In the annular space between the brake drum 29 and the segmental flanges 27 and 28 is a two-part brake band, the parts being designated by the reference characters 33 and 34. These bands are provided with brake lining 35 which bears frictionally upon the brake drum when the brake is in action. Each part 33 or 34 of the brake band has outwardly turned ends, one end being freely seated in a recess 36 in the segmental flange while the opposite end extends around the opposite end of the segmental flange with which it is associated into the space 37 which is wide enough to provide for the working range of the brake band. The last mentioned end of the segmental flange is bifurcated to form a slot 38 and the segmental flange is additionally cut away as shown at 39 to make room for the mounting of the bell crank lever 40 which is best shown in Figure 6. Said bell crank lever is pivoted on a pin 41 which is mounted in the sides of the bifurcation. The short arm 42 of said lever engages the end 43 of the brake band.

A push ring 44 surrounds the segmental flanges 27 and 28 and has inwardly directed pins 45 which bear upon one side of the long arms 46 of the bell crank levers 40. The push ring 44 is reciprocable axially of the plate 24 causing the pins 45 to bear upon the arms 46 oscillating the bell crank levers 40 and pushing the arms 42 of said bell crank levers against the angular ends 43 of the brake bands, contracting said bands against the brake drum 29.

The push ring is actuated by a follower ring 47 which has both rotary and reciprocable movement. The follower ring is preferably of substantially the same diameter as the push ring and preferably rests upon or against the push ring through the intermediary of the roller bearings 48 which are shown as being journalled upon the pins 49, in suitably positioned slots in the push ring. The outer periphery of the follower ring is provided with a plurality of slots or grooves 50 having a slight pitch in the direction of rotation of the follower ring.

The frame 1 is provided in the zone of said follower ring with a plurality of inwardly extending pins 51 which travel in the grooves 50 and by means of which the follower ring is moved axially when rotated. The follower ring 47 is provided with an arcuate series of teeth 52 which are in mesh with a pinion 53 carried at the end of a shaft 54 which extends through the end wall of the frame and projects externally beyond said end wall. When the pinion 53 is rotated slight rotary movement is imparted to the follower ring, and by virtue of the slight pitch of the groove 50, the endwise movement of the push ring, and its effect upon the constriction of the brake bands may be very slight.

A still finer adjustment of the brake pressure is obtained by a worm and pinion connection between the brake-operating lever 55 and the shaft 54 of the pinion 53. Figure 1 shows that the lever 55 is not directly connected to the shaft 54. On the contrary, said shaft is rotatable with respect to the lever 55, but carries a gear 56 meshing with a worm 57 mounted on the lever 55 and operated by means of a knurled knob 58. The worm is irreversible in the sense that unless the knob 58 is turned, the relative positions of the worm and gear 56 and consequently the relative position of the lever 55 with respect to the shaft 54 is constant. The lever 55 preferably operates against a detent quadrant 59 which maintains the lever 55 in any desired position of adjustment. The range of oscillation of the lever 55 upon the quadrant 59 represents variations in the brake pressure from complete release to the maximum pressure in which the brake members are locked against slippage.

In operation, since the worm 57 is irreversible, swinging of the lever 55 oscillates the shaft 54 in the same manner and to the same extent as though the shaft 54 were fixed to said lever. In any position of the lever 55, the turning of the knurled knob 58 produces fine variations in the value of the braking pressure even to a matter of ounces.

It is generally unnecessary to set the brake lever 55 to a position in which the brake band and brake drum are locked against slippage. In the operation of the reel embodying the present invention, it is customary to give the brake an initial maximum pressure limit just short of the rated strength of the line or at a maximum pressure value determined by the anticipated weight and fighting powers of the species of fish which one expects to catch. To make this adjustment, the lever 55 is thrown over to the right referring to Figure 1, as far as may be necessary to produce the necessary resistance to the unwinding of the line. The worm adjustment enables the value of this resistance to be adjusted with great precision. Inasmuch as the brake pressure is applied in an exceedingly gradual manner due to the slight pitch of the groove 50 in the follower ring 47, only the touch of a finger is required to flip the brake lever 55 either to the right or to the left or to adjust it in any desired intermediate position. When it is desired to let the fish run free, the lever 55 is flipped to the upright position shown in Figure 1 in which position the spool and brake drum run out entirely free of any restriction by the brake band. By placing the lever 55 in any intermediate position any desired resistance can be opposed to the movements of the fish. Winding in can be accomplished regardless of the direction of movements of the fish and if the pull of the fish upon the line exceeds the winding pressure for which the brake is set, the fish will unwind the line from the spool even while the winding crank is being operated, but the fish will be pulling against the resistance of the brake. Thus, if the fish is not pulling stronger than the pressure at which the brake is set, the winding is done against fish pressure, while if he is pulling stronger, the winding is done against brake pressure.

Should the fish be pulling, or the brake be set with a force which tires the operator when the crank is coupled to the small gear 13, it is merely necessary to withdraw the crank from the spline socket of said gear and insert it in the spline socket of the large gear 12 which will increase the torque ratio. The reel is by no means out of control while the crank is being thus transferred from one gear to another, and the transfer may be done with as much deliberation as the operator desires, for the movement of the gears is unidirectional, in a winding direction and they therefore will not turn in an unwinding direction. Furthermore, the fish is under the restraint of the brake pressure and may pull out the line if stronger than said restraint or if not he will remain on the line without pulling it out until the transfer of the crank from one socket to another is accomplished and the winding operation can be resumed.

While I have in the above description defined what I believe to be a preferred and practical embodiment of my invention, it will be understood to those skilled in the art that the specific details of construction as illustrated and described are by way of example and not to be construed as limiting the scope of the invention as defined in the appended claims.

What I claim is:

1. Fishing reel comprising a frame having end walls and an intermediate partition defining within said frame a spool chamber and brake chamber, a casing on the outside of the end wall of said brake chamber, a spool within said spool chamber having an axial portion extending into said brake chamber, a brake drum carried by the said extending portion of said spool within said brake chamber, a brake band supporting member within said brake chamber journalled coaxially with said spool having a brake band in operative relation to said brake drum, a train of constantly meshing gears in said casing including a central gear fixed to said brake band supporting member, and gears of different diameter journalled in said casing and in mesh with said central gear, a winding crank, the said gears of different diameter and said crank being formed with interengageable coupling means whereby said crank may be engaged with either of said gears for changing the torque ratio of said reel.

2. Fishing reel comprising a frame having end walls, and an intermediate wall parallel to the end walls defining within said frame a spool chamber and a brake chamber, the interior peripheral walls of at least that portion of said frame constituting said brake chamber being substantially cylindrical, a spool in said spool chamber having a portion exposed to said brake chamber through an opening in said intermediate wall, a brake drum in said brake chamber fixed to said spool, a brake band supporting plate in said brake chamber having peripheral segmental flanges surrounding said brake drum, brake bands mounted on said segmental flanges having a corresponding end of each band angularly deflected, a bell crank for each segmental flange journalled therein adjacent an end thereof having an arm engageable with the angular end of the associated band for closing the band, and having an actuated arm, a push ring surrounding said segmental flanges and having inwardly directed pins engaging said actuated arms, a follower ring surrounding said brake band supporting plate and bearing upon said ring, having a pin and spiral slot connection with the cylindrical inner walls of said frame whereby it moves axially when rotated, said follower ring being provided with peripheral gear teeth, a pinion meshing with said gear teeth, a shaft on which said pinion is mounted extending through the adjacent end wall of said frame, and means for turning said shaft.

3. Fishing reel as claimed in claim 2, said follower ring pressing against the push ring through the intermediary of anti-friction bearings carried by one of said rings.

4. Fishing reel comprising a frame, a spool journalled in said frame, a brake drum carried by said spool, winding means for said spool including a brake band supporting member, a brake band carried thereby circumferentially embracing said brake drum and having an end disposed substantially radially, a bell crank lever pivoted on said brake band supporting member having one end engageable with the radial end of said brake band for constricting said band relative to said drum, means for operating said bell crank comprising a push ring in a zone outside of said brake band and bell crank, axially movable and having a projection engaging the opposite end of said bell crank, a follower ring axially movable when rotated, substantially congruent with respect to said push ring resting upon the same, and means for rotating said follower ring for causing it to press against said push ring.

5. Fishing reel as claimed in claim 4, including anti-friction bearings between said push ring and said follower ring.

6. Fishing reel as claimed in claim 4, the means for rotating said follower ring comprising a pinion meshing with teeth on said follower ring, a shaft on which said pinion is mounted extending to a point outside of said frame, a lever for turning said shaft and an intermediate connection between said lever and shaft for adjusting the angular relation of said lever to said shaft.

7. Fishing reel comprising a frame, a spool journalled in said frame, a brake drum carried by said spool, winding means for said spool including a brake band supporting member, a brake band carried thereby circumferentially of said drum having a radially turned end, a bell crank lever pivotally mounted on said brake band supporting member having one arm operatively engageable with the angular end of said brake band for moving the latter into constrictive relation to said drum, an axially movable push ring encompassing said brake band supporting member having a projection engageable with the opposite end of said bell crank lever for rocking the same, a follower ring substantially congruent with said push ring and resting thereupon, said follower ring having a pin and spiral slot connection with said frame, said slot being of slight pitch whereby the ratio of axial movement of said follower ring to its angular displacement is small, means for rotating said follower ring comprising a pinion in mesh with teeth on said follower ring, a shaft on which said pinion is mounted extending to a point outside of said frame, a lever for turning said shaft, and an indirect connection between said lever and shaft for varying the angular relation of said lever and shaft.

8. Fishing reel as claimed in claim 7, the indirect connection between said lever and shaft including a worm and pinion with means for adjusting said worm.

9. Fishing reel comprising a spool, and a frame supporting said spool, a brake comprising an element rotatable with said spool and a cooperating element supported by said frame limited to unidirectional rotation in a winding direction, a gear fixed to said cooperating element, and two gears of different size independently and permanently in mesh with said first mentioned gear for applying different values of winding torque to said cooperating element, said gears of different size having couplings exposed through said frame, and a detachable crank adapted to be selectively connected to either of said couplings.

10. Fishing reel comprising a spool, and a frame supporting said spool, a brake comprising an element rotatable with said spool and a cooperating element supported by said frame limited to unidirectional rotation in a winding direction, means for setting said brake to slip at any determined pressure, a gear fixed to said cooperating element, and two gears of different size independently and permanently in mesh with said first mentioned gear for applying different values of torque to said cooperating element, said gears of different size having couplings exposed through said frame, and a detachable crank adapted to be successively connected to either of said couplings.

11. Fishing reel comprising a spool and a frame supporting said spool, a brake comprising an element rotatable with said spool and a cooperating element supported by said frame limited to unidirectional rotation in a winding direction, a gear fixed to said cooperating element, and two gears of different size independently and permanently in mesh with said first mentioned gear for applying different values of torque to said cooperating element, said gears of different size being each provided with a socket of non-circular cross-section exposed through said frame, and a detachable crank having a portion formed to fit said sockets whereby said crank may be selectively engaged with either of said sockets for winding said spool at different torque ratios.

FREDERICK M. GRIETEN.